United States Patent Office 3,428,632
Patented Feb. 18, 1969

3,428,632
PRODUCTION OF 3,4,5,6-TETRAHYDRO-4,5,6-SUBSTITUTED-2H-1,3,4-OXADIAZIN-2-ONES
Donald L. Trepanier, Indianapolis, Ind., and Guy H. Harris, Concord, Calif., assignors to The Dow Chemical Company, Midland, Mich., a corporation of Delaware
No Drawing. Filed Sept. 23, 1966, Ser. No. 581,431
U.S. Cl. 260—244
Int. Cl. C07d 87/08
9 Claims

ABSTRACT OF THE DISCLOSURE

A method of preparing 3,4,5,6-tetrahydro-4,5,6-substituted-2H-1,3,4-oxadiazin-2-one compounds by the reaction of a substituted hydrazine with phosgene and hydrogen chloride.

---

This invention relates to a novel method for preparing heterocyclic compounds and is particularly directed to the reaction of substituted hydrazines with hydrogen chloride and phosgene and to ring closure of the reaction product to produce 3,4,5,6 - tetrahydro - 4,5,6 - substituted - 2H-1,3,4-oxadiazin-2-ones corresponding to the formula:

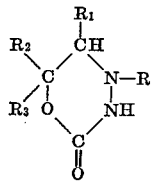

In the present specification and claims, R represents methyl, ethyl, propyl or butyl, $R_1$ represents hydrogen, methyl, ethyl, propyl or butyl, $R_2$ represents hydrogen, methyl or ethyl and $R_3$ represents hydrogen, phenyl, halophenyl or a lower alkyl group containing from 1 to 5 carbon atoms, inclusive. Certain 3,4,5,6-tetrahydro-4,5,6-substituted-2H-1,3,4-oxadiazin-2-ones are disclosed and claimed in our copending joint application, Ser. No. 581,449, filed concurrently herewith, now U.S. Patent 3,377,345.

According to the invention, hydrogen chloride and phosgene are reacted with a substituted 2-hydroxyethyl hydrazine corresponding to the formula:

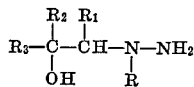

to produce the oxadiazin-2-ones. The hydrazines may be prepared by known methods such as heating an alkyl hydrazine with an alkyl epoxide in the presence of a base.

In carrying out the process of the invention, the above-described hydrazine is reacted with gaseous hydrogen chloride and the product of this reaction is reacted with gaseous phosgene. The reaction is preferably carried out at temperatures of from about zero to about 5° C. in an ice water bath and is carried out in the presence of an inert organic solvent such as toluene. The oxadiazinone product precipitates from the reaction mixture as a gummy, fleecy solid. The proportions of the reactants to be employed are not critical, some of the desired product being obtained when combining the reactants in any proportions. However, the reaction consumes the reactants in substantially equimolar proportions and the use of the reactants in at least such proportions is desirable, the use of an excess of the gaseous materials being preferred.

The time between addition of hydrogen chloride and addition of phosgene is not critical, some of the desired products being obtained when holding the product for times varying from a few seconds to about 65 hours. Best results are usually obtained by the use of a moderately long hold time, such as several hours to overnight, before beginning phosgene addition. The holding temperature and phosgene addition temperature are not critical, some of the desired products being obtained when the mixture is held at a temperature of from about zero to about 5° C. for the entire reaction period and some of the materials also being obtained when the reaction mixture is allowed to warm to 20°–25° C. immediately after hydrogen chloride addition. Retention of the reaction mixture at about zero to 5° C. until phosgene addition is completed is preferred.

The reactions proceed readily when the gaseous reactants are contacted with the other reactants at atmospheric pressure; however, pressures of from somewhat below atmospheric to considerably above atmospheric may be employed if desired. The gaseous reactants are corrosive and toxic. Thus, to minimize hazards, the reaction zone should be suitably vented to dissipate or absorb excess unreacted hydrogen chloride, phosgene or decomposition products thereof. The reaction is conveniently carried out in glass or glass-lined apparatus. Alternatively, the reaction equipment can be fabricated from suitable corrosion-resistant metals.

The following examples illustrate the invention but are not to be construed as limiting the same.

EXAMPLE 1

N-amino-1-ephedrine (100 grams; 2.77 moles) was dissolved in about 6 liters of toluene. The solution, in a three-necked round flask, was submersed in an ice bath and hydrogen chloride gas (excess) was bubbled through the solution for about one hour at about zero to 5° C. During the hydrogen chloride addition, a fleecy-looking solid formed which had gathered into gummy masses by the time that gas addition was stopped. The reaction mixture was removed from the ice bath and permitted to warm to room temperature while phosgene was added. Phosgene was bubbled through the reaction mixture for about one hour at 20°–25° C., after which the mixture was heated. During the heating, the gummy solid formed a finely divided precipitate and excess phosgene gas was driven off. The solid was collected in a sintered glass funnel, washed with pentane and mixed with about 10 liters of sodium bicarbonate solution. An oil separated from the aqueous bicarbonate and was collected at the interface of a mixture of aqueous bicarbonate and pentane. The oil was induced to crystallize with seeds saved from an earlier work-up of a small sample. The 3,4,5,6-tetrahydro - 4,5 - dimethyl - 6 - phenyl - 2H - 1,3,4-oxadiazin-2-one product was recrystallized from carbon tetrachloride and found to melt at 117°–120° C.

EXAMPLE 2

N-amino-1-ephedrine (750 grams; 4.16 moles) was dissolved in about 6 liters of toluene. The solution was held at zero to 5° C. while hydrogen chloride gas was bubbled therethrough for about one hour, after which the reaction mixture was allowed to warm to room temperature. Gaseous phosgene was then bubbled through the mixture for about one hour after which the toluene was decanted off, leaving a gummy precipitate. Aqueous sodium bicarbonate solution was then added to the reaction flask and the product separated as an oil layer. The oily product was induced to crystallize upon addition of seeds saved from the preparation of Example 1 and was recrystallized from carbon tetrachloride. The 3,4,5,6,-tetrahydro - 4,5 - dimethyl - 6 - phenyl-2H-1,3,4-oxadiazin-2-one product was found to melt at 119° C.

EXAMPLE 3

N-amino-1-ephedrine (912.0 grams; 5.06 moles) was dissolved in about 7 liters of toluene. The ephedrine solution, in a three-necked round-bottom flask, was submersed in an ice bath and HCl gas (excess) was bubbled through the solution until a fleecy-looking solid material had formed into gummy masses (about one hour). The reaction mixture was allowed to stand for about 12–16 hours before phosgene (excess) was bubbled through the mixture. After about one hour of phosgene addition, the reaction mixture was removed from the ice water bath and heated to drive off excess phosgene. During the heating, the gummy, fleecy-looking solid broke up to form a finely divided solid. The 3,4,5,6-tetrahydro-4,5-dimethyl-6-phenyl-2H-1,3,4-oxadiazin-2-one product was collected by filtration through a sintered glass funnel. The solid was rinsed with pentane. The product was collected at the interface of a mixture of pentane and aqueous sodium bicarbonate as an oil layer. The oil crystallized, the crystallization being induced by seeds of the oxadiazine product prepared earlier. The product was recrystallized from carbon tetrachloride using about one liter of carbon tetrachloride for each 100 grams of crude product and found to melt at 120° C. (yield: 404.8 grams; 40.5 percent).

In substantially the same procedure, 3,4,5,6-tetrahydro-4,5-dimethyl-6-phenyl-2H-1,3,4-oxadiazin-2-one was prepared with the following variations:

The reaction mixture was held in the ice bath at zero to 5° C. for about 18 hours after hydrogen chloride addition had ceased and was held at zero to 5° C. during phosgene addition. In a further preparation, phosgene addition was begun immediately after hydrogen chloride addition was discontinued, the reaction mixture being held at zero to 5° C. until phosgene addition was completed. The product was found to melt at 119° C.

Phosgene addition was begun immediately after discontinuing hydrogen chloride addition, with the reaction mixture remaining in the ice bath at zero to 5° C. After filtration, the solid was held overnight. The product was found to melt at 115°–117° C.

After hydrogen chloride addition was completed, the reaction mixture was held at zero to 5° C. for about 65 hours before phosgene addition was begun. The product was found to melt at 120° C.

Other substituted hydrazines can be employed in the method of this invention to produce substituted 1,3,4-oxadiazin-2-ones. Representative oxadiazinones which may be produced by the method of the invention include the following:

3,4,5,6 - tetrahydro-5,6-diisopropyl-4-methyl-2H-1,3,4-oxadiazin-2-one, having a melting point of 118°–120° C., is prepared by contacting 1-methyl-1-(1-isopropyl-2-hydroxy-3,3-dimethyl-n-propyl)hydrazine with hydrogen chloride gas and thereafter contacting the resulting mixture with phosgene gas.

3,4,5,6 - tetrahydro-4,6-dimethyl-6-neopentyl-2H-1,3,4-oxadiazin-2-one, having a melting point of 119°–120.5° C., is prepared by contacting 1-methyl-1-(2-hydroxy-2,4,4-trimethyl-n-pentyl)hydrazine with hydrogen chloride gas and thereafter contacting the resulting mixture with phosgene gas.

3,4,5,6 - tetrahydro-4-butyl-5-ethyl-6-ethyl-6-isopropyl-2H-1,3,4-oxadiazin-2-one is prepared by contacting 1 - methyl-1-(1-ethyl-2-hydroxy - 2 - ethyl-3-methyl-n-butyl)hydrazine with hydrogen chloride gas and thereafter contacting the resulting mixture with phosgene gas.

3,4,5,6 - tetrahydro-4-ethyl - 5 - butyl-6-methyl-6-(p-chlorophenyl)-2H-1,3,4-oxadiazin-2-one is prepared by contacting 1-ethyl-1-[1-butyl-2-hydroxy-2-(p-chlorophenyl)-n-propyl]-hydrazine with hydrogen chloride gas and thereafter contacting the resulting mixture with phosgene gas.

3,4,5,6 - tetrahydro-4,5,6,6-tetramethyl-2H-1,3,4-oxadiazin-2-one is prepared by contacting 1-methyl-1-(1,2-dimethyl - 2 - hydroxy-n-propyl)hydrazine with hydrogen chloride gas and thereafter contacting the resulting mixture with phosgene gas.

We claim:
1. A process for making a substituted oxadiazin-2-one corresponding to the formula

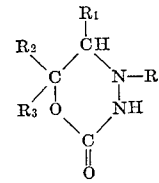

wherein R represents a member of the group consisting of methyl, ethyl, propyl and butyl, $R_1$ represents a member of the group consisting of hydrogen, methyl, ethyl, propyl and butyl, $R_2$ represents a member of the group consisting of hydrogen, methyl and ethyl and $R_3$ represents a member of the group consisting of hydrogen, phenyl, chlorophenyl and lower alkyl of from 1 to 5 carbon atoms, inclusive, the process comprising mixing a substituted 2-hydroxyethyl hydrazine corresponding to the formula

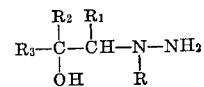

wherein R, $R_1$, $R_2$ and $R_3$ have the above significance, successively with hydrogen chloride and phosgene and separating the thus-formed oxadiazin-2-one product.

2. The process of claim 1 wherein the mixing comprises dissolving the hydrazine in an inert organic solvent, contacting hydrogen chloride gas with the resulting hydrazine solution and thereafter contacting the resulting mixture with phosgene gas.

3. The process of claim 2 wherein the reaction mixture is maintained at a temperature of about zero to about 5° C.

4. The process of claim 3 wherein the reaction mixture is held for about 12 to about 65 hours at a temperature of about 0°–5° C. after contacting the hydrazine with hydrogen chloride and before contacting the mixture with phosgene.

5. The process for making 3,4,5,6-tetrahydro-4,5-dimethyl-6-2H-1,3,4-oxadiazin-2-one comprising contacting N-amino-ephedrine with hydrogen chloride and thereafter contacting the resulting mixture with phosgene and separating the thus-formed oxadiazinone product.

6. The process of claim 5 wherein the N-amino-ephedrine is dissolved in toluene.

7. The process of claim 5 wherein the mixture is maintained at about zero to 5° C.

8. The process of claim 5 wherein the mixture is held at zero to 5° C. for about 12 to 65 hours after contacting the N-amino-ephedrine with hydrogen chloride and before contacting the mixture with phosgene.

9. The process of claim 5 wherein the mixture is held at about zero to 5° C. for about 12 to 18 hours after contacting the N-amino-ephedrine with hydrogen chloride and before contacting the mixture with phosgene.

References Cited

FOREIGN PATENTS 773,011  4/1957  Great Britain.

NORMA S. MILESTONE, *Primary Examiner.*

N. TROUSOF, *Assistant Examiner.*

U.S. Cl. X.R.

260—569, 584

UNITED STATES PATENT OFFICE
CERTIFICATE OF CORRECTION

Patent No. 3,428,632                                              February 18, 1969

Donald L. Trepanier et al.

It is certified that error appears in the above identified patent and that said Letters Patent are hereby corrected as shown below:

Column 4, line 49, after "dimethyl-6-" insert -- phenyl --.

Signed and sealed this 7th day of April 1970.

(SEAL)
Attest:

Edward M. Fletcher, Jr.                                    WILLIAM E. SCHUYLER, JR.
Attesting Officer                                                Commissioner of Patents